US012576715B2

(12) United States Patent
Tsujino et al.

(10) Patent No.: US 12,576,715 B2
(45) Date of Patent: Mar. 17, 2026

(54) INFORMATION PROCESSING DEVICE AND VEHICLE

(71) Applicant: TOYOTA JIDOSHA KABUSHIKI KAISHA, Toyota (JP)

(72) Inventors: Miki Tsujino, Nagakute (JP); Sara Yamafuji, Miyoshi (JP); Makoto Suzuki, Seto (JP); Takatoshi Hattori, Nagoya (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 18/486,460

(22) Filed: Oct. 13, 2023

(65) Prior Publication Data

US 2024/0246413 A1 Jul. 25, 2024

(30) Foreign Application Priority Data

Jan. 20, 2023 (JP) ................................. 2023-007605

(51) Int. Cl.
| | |
|---|---|
| *B60K 35/00* | (2024.01) |
| *B60K 35/29* | (2024.01) |
| *B60W 30/16* | (2020.01) |
| *B60K 35/22* | (2024.01) |
| *B60K 35/28* | (2024.01) |

(52) U.S. Cl.
CPC ............. *B60K 35/29* (2024.01); *B60W 30/16* (2013.01); *B60K 35/22* (2024.01); *B60K 35/28* (2024.01); *B60K 2360/179* (2024.01); *B60K 2360/188* (2024.01); *B60W 2554/80* (2020.02)

(58) Field of Classification Search
CPC ........ B60K 35/29; B60K 35/22; B60K 35/28; B60K 2360/179; B60K 2360/188; B60K 35/00; B60W 30/16; B60W 2554/80; B60W 50/14; B60W 2050/146; G07C 5/0825; G07C 5/085; G07C 5/0866; G08G 1/096725; G08G 1/096733; G08G 1/096791; G08G 1/096855
See application file for complete search history.

(56) References Cited

U.S. PATENT DOCUMENTS

| | | | | |
|---|---|---|---|---|
| 11,467,277 | B2 * | 10/2022 | Masui ..................... | B60R 21/00 |
| 12,233,903 | B2 * | 2/2025 | Nishino ............. | B60W 40/072 |
| 12,259,462 | B2 * | 3/2025 | Zhu .......................... | G06T 7/70 |

(Continued)

FOREIGN PATENT DOCUMENTS

| | | |
|---|---|---|
| JP | 2012-018566 A | 1/2012 |
| JP | 2020-189549 A | 11/2020 |

*Primary Examiner* — Mussa A Shaawat
(74) *Attorney, Agent, or Firm* — SoraIP, Inc.

(57) ABSTRACT

The information processing device includes an acquisition unit that acquires detection information detected by a detection unit including the vehicle speed of the own vehicle and the inter-vehicle distance from another vehicle running ahead of the own vehicle in the traveling direction of the own vehicle; displaying on a display unit in the vehicle a graphical image representing information about the inter-vehicle time required for the own vehicle to reach the position where the other vehicle is located, which is derived using the acquired detection information; a display control unit that changes display of the graphic image when a magnitude of variation in at least one of the vehicle speed and the inter-vehicle distance included in the information exceeds a predetermined threshold.

7 Claims, 6 Drawing Sheets

(56)     References Cited

U.S. PATENT DOCUMENTS

| | | | | |
|---|---|---|---|---|
| 2007/0171121 A1* | 7/2007 | Munakata | ............. | G01S 13/931 |
| | | | | 342/146 |
| 2013/0166150 A1* | 6/2013 | Han | ..................... | B60W 10/18 |
| | | | | 701/41 |
| 2014/0176350 A1* | 6/2014 | Niehsen | ............. | B60W 50/085 |
| | | | | 340/988 |
| 2014/0222280 A1* | 8/2014 | Salomonsson | ............ | B60R 1/26 |
| | | | | 701/1 |
| 2016/0009281 A1* | 1/2016 | Tokimasa | ............. | G01S 13/931 |
| | | | | 701/96 |
| 2016/0167514 A1* | 6/2016 | Nishizaki | ............. | B60K 35/234 |
| | | | | 345/7 |
| 2016/0170487 A1* | 6/2016 | Saisho | ................... | B60K 35/28 |
| | | | | 345/156 |
| 2017/0045737 A1* | 2/2017 | Cammenga | ........... | E06B 3/6722 |
| 2017/0259734 A1* | 9/2017 | Imaishi | .................. | G08G 1/166 |
| 2017/0336629 A1* | 11/2017 | Suzuki | ................ | G05D 1/0088 |
| 2018/0198955 A1* | 7/2018 | Watanabe | ............. | G02B 27/01 |
| 2019/0005921 A1* | 1/2019 | Kawaji | .................. | G02B 27/01 |
| 2019/0196184 A1* | 6/2019 | Takizawa | ............. | G01C 21/365 |
| 2019/0225210 A1* | 7/2019 | Herman | ................. | G08G 1/161 |
| 2019/0391400 A1* | 12/2019 | Funabiki | ............ | G02B 27/0101 |
| 2020/0369151 A1 | 11/2020 | Nakajima | | |
| 2021/0229659 A1* | 7/2021 | Kamatani | ........... | B60W 30/181 |
| 2021/0354716 A1* | 11/2021 | Kim | ........................... | G06T 7/60 |
| 2022/0118850 A1* | 4/2022 | Ito | .......................... | B60K 35/28 |
| 2022/0135062 A1* | 5/2022 | Seitz | ..................... | B60K 35/22 |
| | | | | 701/23 |
| 2022/0185308 A1* | 6/2022 | Baek | ..................... | H04N 23/23 |
| 2022/0289187 A1* | 9/2022 | Wilson | .................. | B60K 35/10 |

* cited by examiner

F I G. 1
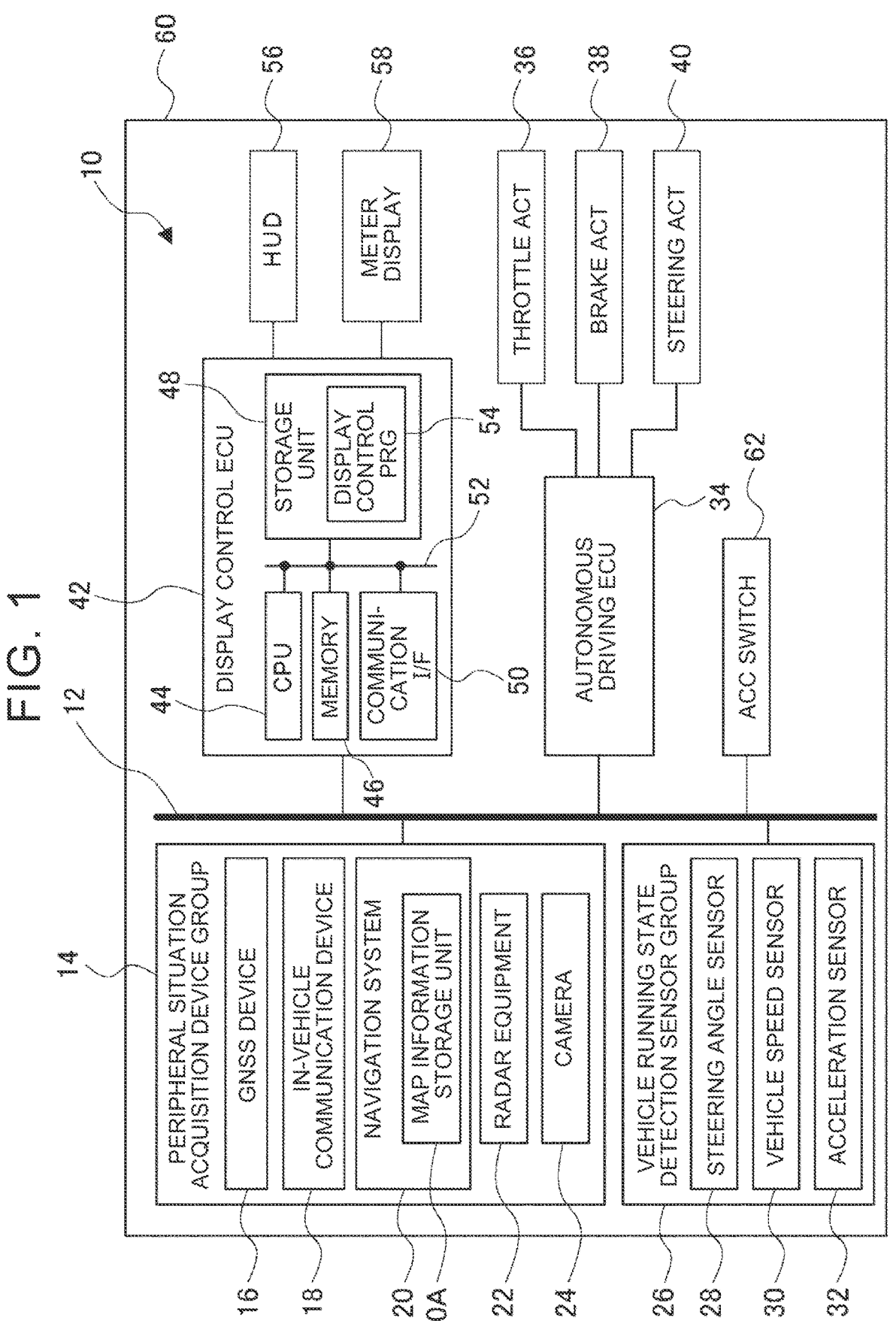

FIG. 2

INFORMATION PROCESSING DEVICE AND VEHICLE

CROSS-REFERENCE TO RELATED APPLICATION

This application claims priority to Japanese Patent Application No. 2023-007605 filed on Jan. 20, 2023, incorporated herein by reference in its entirety.

BACKGROUND

1. Technical Field

The present disclosure relates to an information processing device and a vehicle.

2. Description of Related Art

Japanese Unexamined Patent Application Publication No. 2020-189549 (JP 2020-189549 A) discloses a technique for displaying a bar graph on a display unit, as information about the inter-vehicle distance between an own vehicle and another vehicle traveling in front of the own vehicle in the traveling direction of the own vehicle. In the bar graph, the length of a bar along the extension direction of the road changes in accordance with the inter-vehicle distance.

SUMMARY

As a type of adaptive cruise control (ACC) that allows an own vehicle to follow another vehicle, an ACC that controls traveling such that an inter-vehicle time required for the own vehicle to reach the position in which the other vehicle is located becomes equal to a specified value (hereafter referred to the "inter-vehicle time control ACC") is known. When the inter-vehicle time control ACC is applied to the technology disclosed in JP 2020-189549 A, it is assumed that the bar graph indicates the inter-vehicle distance between the own vehicle and the other vehicle and the inter-vehicle time.

Here, in the inter-vehicle time control ACC, the own vehicle is decelerated in accordance with the deceleration of the other vehicle such that the inter-vehicle time becomes the specified value. Therefore, there is a possibility that the display of the bar graph indicating the inter-vehicle time does not change and the occupant may not be able to recognize the change in the vehicle speed. Further, in the inter-vehicle time control ACC, the inter-vehicle distance between the own vehicle and the other vehicle varies in accordance with the vehicle speed. When the display of the bar graph indicating the inter-vehicle distance is not changed, the occupant may not be able to recognize the change in the inter-vehicle distance.

Therefore, an object of the present disclosure is to provide an information processing device and a vehicle that allow an occupant to grasp changes in at least one of the vehicle speed of an own vehicle and the inter-vehicle distance between the own vehicle and another vehicle by looking at an in-vehicle display.

According to a first aspect, the information processing device includes: an acquisition unit that acquires detection information detected by a detection unit, the detection information including a vehicle speed of an own vehicle and an inter-vehicle distance between the own vehicle and another vehicle traveling in front of the own vehicle in a traveling direction of the own vehicle; and a display control unit that causes a display unit in a vehicle cabin to display a graphic image and that changes a display of the graphic image when a magnitude of a change in at least one of the vehicle speed and the inter-vehicle distance that are included in the detection information exceeds a predetermined threshold, the graphic image being obtained by schematizing information related to an inter-vehicle time that is derived using the detection information acquired by the acquisition unit and that is required for the own vehicle to reach a position in which the other vehicle is located.

In the information processing device according to the first aspect, the acquisition unit acquires detection information detected by a detection unit, the detection information including a vehicle speed of an own vehicle and an inter-vehicle distance between the own vehicle and another vehicle. The display control unit causes a display unit to display a graphic image and changes a display of the graphic image when a magnitude of a change in at least one of the vehicle speed and the inter-vehicle distance that are included in the detection information exceeds a predetermined threshold, the graphic image being obtained by schematizing information related to an inter-vehicle time that is derived using the acquired detection information. With the above configuration, the information processing device changes the display of the graphic image when the magnitude of the change in at least one of the vehicle speed and the inter-vehicle distance exceeds the predetermined threshold. The information processing device allows an occupant to grasp the change in at least one of the vehicle speed and the inter-vehicle distance as the occupant looks at the display unit.

In the information processing device according to the first aspect, the display control unit may change a color of the graphic image around a moment when the magnitude of the change exceeds the predetermined threshold.

In the information processing device according to the first aspect, the display control unit may change a color of the graphic image around a moment when the magnitude of the change in at least one of the vehicle speed of the own vehicle and the inter-vehicle distance between the own vehicle and the other vehicle exceeds the predetermined threshold. Thus, the information processing device allows the occupant to grasp the change in at least one of the vehicle speed and the inter-vehicle distance through the color change by changing the color of the graphic image.

In the information processing device according to the first aspect, the display control unit may change a dimension of the graphic image along a predetermined direction corresponding to the traveling direction around a moment when the magnitude of the change exceeds the predetermined threshold.

In the information processing device according to the first aspect, the display control unit may change a dimension of the graphic image along a predetermined direction corresponding to the traveling direction of the own vehicle around a moment when the magnitude of the change in at least one of the vehicle speed of the own vehicle and the inter-vehicle distance between the own vehicle and the other vehicle exceeds the predetermined threshold. Thus, the information processing device allows the occupant to grasp the change in at least one of the vehicle speed and the inter-vehicle distance through the dimension change by changing the dimension of the graphic image along the predetermined direction.

In the information processing device according to the first aspect, when the detection unit detects a different vehicle that has entered between the own vehicle and the other vehicle, the display control unit may cause the display unit to display a different vehicle image indicating the different vehicle.

In the information processing device according to the first aspect, when the detection unit detects a different vehicle that has entered between the own vehicle and the other vehicle, the display control unit may cause the display unit to display a different vehicle image. Thus, the information processing device allows the occupant to grasp the presence of the different vehicle as the occupant looks at the display unit.

According to a second aspect, a vehicle includes: the information processing device according to the first aspect; a reception unit that receives a specified value of the inter-vehicle time; and a travel control unit that controls traveling of the own vehicle such that a detected value of the inter-vehicle time derived by the display control unit corresponds to the specified value of the inter-vehicle time received by the reception unit.

In the vehicle according to the second aspect, the reception unit receives a specified value of the inter-vehicle time. The travel control unit controls traveling of the own vehicle such that a detected value of the inter-vehicle time derived by the display control unit of the information processing device corresponds to the specified value of the inter-vehicle time received by the reception unit. Thus, the vehicle can control the traveling of the own vehicle such that the inter-vehicle time becomes the specified value. At the same time, the vehicle allows the occupant to grasp the change in at least one of the vehicle speed of the own vehicle and the inter-vehicle distance between the own vehicle and the other vehicle as the occupant looks at the display unit.

As described above, an information processing device and a vehicle according to the present disclosure allow an occupant to grasp changes in at least one of the vehicle speed of an own vehicle and the inter-vehicle distance between the own vehicle and another vehicle by looking at an in-vehicle display.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing a schematic configuration of an in-vehicle system;

FIG. 2 is a functional block diagram of an autonomous driving ECU and a display control ECU;

DETAILED DESCRIPTION OF EMBODIMENTS

Figure 3:
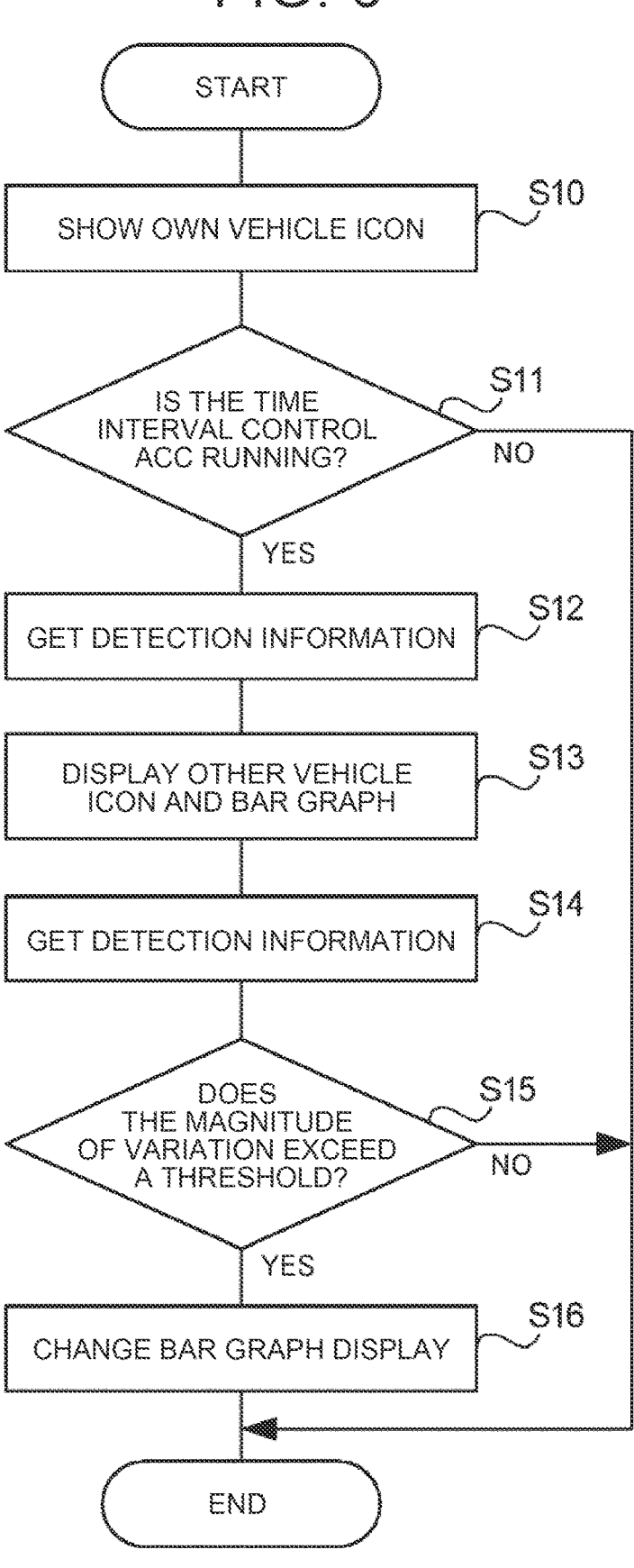
FIG. 3 is a flowchart showing the flow of control processing.

An example of an embodiment of the present disclosure will be described in detail below with reference to the drawings.

First Embodiment

First, a first embodiment of an in-vehicle system 10 according to this embodiment will be described.

FIG. 1 is a block diagram showing a schematic configuration of an in-vehicle system 10 mounted on a vehicle 60. As shown in FIG. 1, the in-vehicle system 10 has a communication bus 12. A peripheral situation acquisition device group 14, a vehicle running state detection sensor group 26, an ACC switch 62, an automatic driving an electronic control unit (ECU) 34, and a display control ECU 42 are each connected to the communication bus 12. Note that FIG. 1 shows only a partial configuration of the in-vehicle system 10. Also, the vehicle 60 on which the in-vehicle system 10 is mounted is hereinafter referred to as the own vehicle 60. Own vehicle 60 is an example of "own vehicle" and "vehicle". The peripheral situation acquisition device group 14 and the vehicle running state detection sensor group 26 are examples of the "detection unit". The display control ECU 42 is an example of an "information processing device".

The peripheral situation acquisition device group 14 includes, as devices for acquiring information indicating the state of the surrounding environment of the own vehicle 60, a global navigation satellite system (GNSS) device 16, an in-vehicle communication device 18, a navigation system 20, and a radar device 20, and a camera 24.

The GNSS device 16 receives GNSS signals from a plurality of GNSS satellites and measures the position of the own vehicle 60. The in-vehicle communication device 18 is a communication device that performs at least one of inter-vehicle communication with other vehicles and road-to-vehicle communication with a roadside device. The navigation system 20 includes a map information storage unit 20A that stores map information. Further, the navigation system 20 displays the position of the own vehicle 60 on a map and plots the route to the destination based on the position information obtained from the GNSS device 16 and the map information stored in the map information storage unit 20A. Perform processing such as guidance.

The radar device 22 detects objects such as pedestrians and other vehicles existing around the own vehicle 60 as point group information, and obtains the relative position, relative speed, and inter-vehicle distance between the detected objects and the own vehicle 60. Then, the radar device 22 outputs information such as the acquired relative position, relative speed, and inter-vehicle distance. The camera 24 photographs the surroundings of the own vehicle 60 with a plurality of cameras and outputs the photographed images.

The vehicle running state detection sensor group 26 includes, as a plurality of sensors for acquiring the running state of the own vehicle 60, a steering angle sensor 28 for detecting the steering angle of the own vehicle 60, a vehicle speed sensor 30 for detecting the speed of the own vehicle 60, and an acceleration sensor 32 for detecting acceleration applied to the own vehicle 60.

The ACC switch 62 is a switch that can switch on/off the inter-vehicle time control ACC and set a designated value of the inter-vehicle time control in the inter-vehicle time control ACC. The inter-vehicle time control ACC is an ACC that controls traveling so that the inter-vehicle time required for the vehicle 60 to reach the position where another vehicle (hereinafter referred to as "preceding vehicle to be followed") traveling in front of the own vehicle 60 in the traveling direction is present becomes the specified value. The ACC switch 62 may be a physical switch or a virtual switch.

The autonomous driving ECU 34 is connected to a throttle ACT 36 that changes the throttle opening of the own vehicle 60 and a brake ACT 38 that changes the braking force generated by the braking device of the own vehicle 60. The autonomous driving ECU 34 is also connected to a steering ACT 40 that changes the amount of steering by the steering device of the own vehicle 60. The autonomous driving ECU 34 is an ECU that performs automatic driving processing for automatically driving the own vehicle 60 without any driving operation by the occupant of the own vehicle 60.

Although not shown, the autonomous driving ECU 34 includes a central processing unit (CPU), a read only memory (ROM), a random access memory (RAM) memory, a hard disk drive (HDD), a solid state drive (SSD), etc. and a communication interface (I/F). The storage unit stores automatic driving software.

The display control ECU 42 is connected to a head-up display (hereinafter referred to as HUD) 56 and meter display 58. The display control ECU 42 is an ECU that controls information display on the HUD 56 and the meter display 58. The HUD 56 according to the present embodiment is a small HUD whose display range is part of the forward field of view of the occupant of the own vehicle 60 due to reflection on the windshield glass or the like. Moreover, the meter display 58 is a display provided on the instrument panel of the own vehicle 60. The meter display 58 is an example of a "display unit".

The display control ECU 42 also includes a CPU 44, ROM and RAM memory 46, a non-volatile storage unit 48 such as an HDD or SSD, and a communication I/F 50. The CPU 44, memory 46, storage unit 48, and communication I/F 50 are connected via an internal bus 52 so as to be able to communicate with each other. The storage unit 48 stores a display control program 54.

Figure 2:
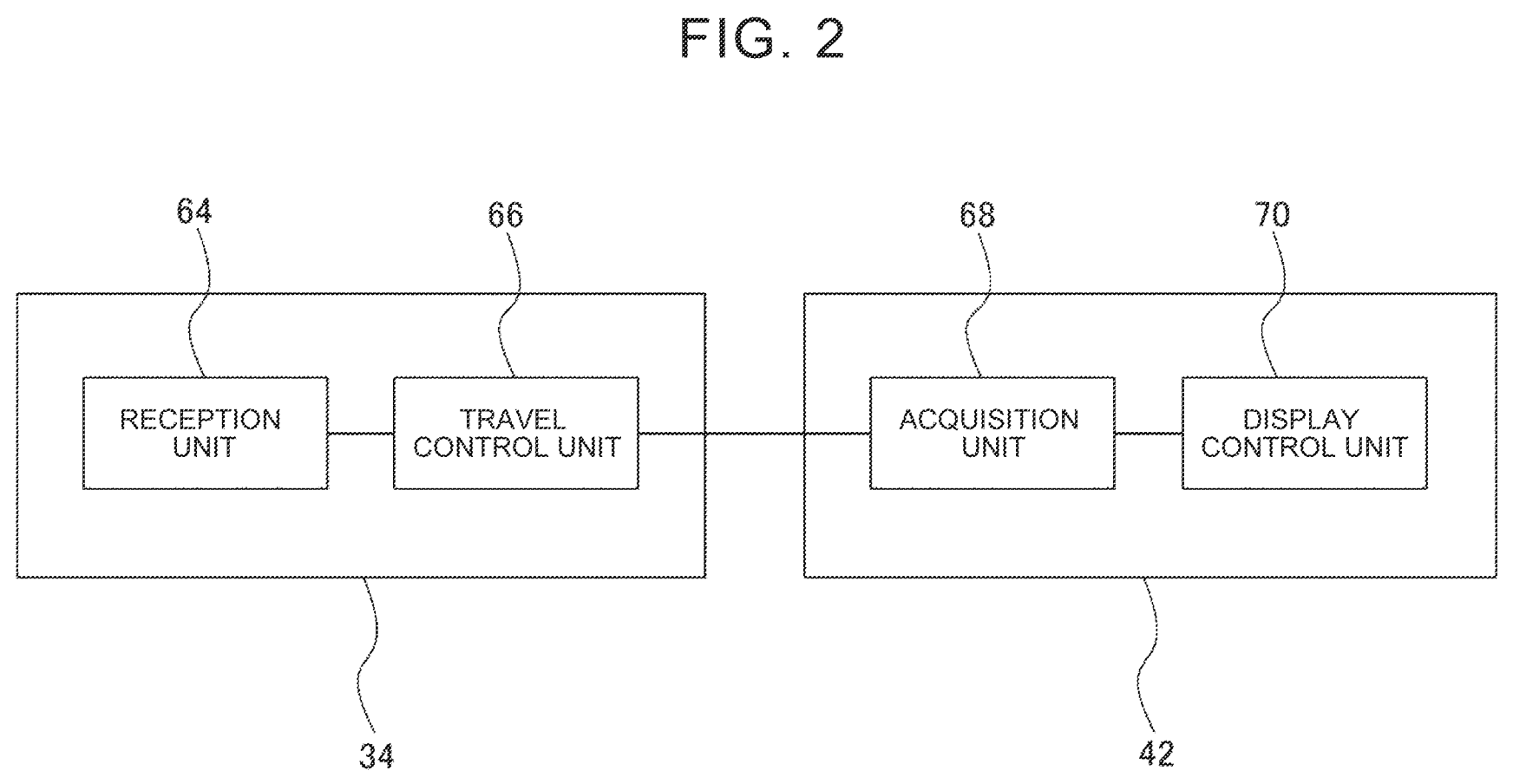

FIG. 2 is a functional block diagram of the autonomous driving ECU 34 and the display control ECU 42. As shown in FIG. 2, the autonomous driving ECU 34 functions as a reception unit 64 and a travel control unit 66 as the CPU executes automatic driving software. In addition, the display control ECU 42 reads the display control program 54 from the storage unit 48 and develops in the memory 46, and the display control program 54 is executed by the CPU 44, thereby functioning as an acquisition unit 68 and a display control unit 70.

Reception unit 64 accepts the specified value of the inter-vehicle time in inter-vehicle time control ACC set via ACC switch 62. In this embodiment, as an example, the inter-vehicle time level is classified into four levels of "large", "medium", "small", and "minimum". Therefore, the reception unit 64 receives information indicating which of the above four stages is designated as the designated value of the inter-vehicle time.

When the inter-vehicle time control ACC is turned on via the ACC switch 62, the reception unit 64 receives the detection value of the inter-vehicle time between the own vehicle 60 and the preceding vehicle to be followed, which is derived by the display control unit 70. The travel control unit 66 controls the travel of the own vehicle 60 so as to correspond to the specified value of the inter-vehicle time. Specifically, the throttle ACT 36, the brake ACT 38, and the steering ACT 40 are performed based on information obtained from the peripheral situation acquisition device group 14 and the vehicle running state detection sensor group 26 so that the detection values correspond to the specified values. By controlling, the travel control unit 66 performs inter-vehicle time control ACC.

Controlling the detected value so as to correspond to the specified value can be realized by, for example, the following method. For example, the storage unit of the autonomous driving ECU 34 stores a conversion table that predefines the relationship between the designated value of the inter-vehicle time and the inter-vehicle distance for each vehicle speed. Using this conversion table, the autonomous driving ECU 34 obtains the target value of the inter-vehicle distance corresponding to the specified values of the vehicle speed and inter-vehicle time. As a function of the travel control unit 66, the autonomous driving ECU 34 performs control so that the detected value of the inter-vehicle distance between the own vehicle 60 and the preceding vehicle to be followed matches the target inter-vehicle distance.

The acquisition unit 68 acquires the vehicle speed of the own vehicle 60 from the vehicle speed sensor 30. The acquisition unit 68 obtains from the radar device 22 the inter-vehicle distance between the own vehicle 60 and the preceding vehicle to be followed. The acquisition unit 68 obtains from the ACC switch 62 the specified value of the inter-vehicle time between the own vehicle 60 and the preceding vehicle to be followed. Information acquired by the acquisition unit 68 from the vehicle speed sensor 30, the radar device 22, the ACC switch 62, and the like is hereinafter collectively referred to as "detection information."

The display control unit 70 controls display contents of the meter display 58. For example, the display control unit 70 indicates an own vehicle icon 72 indicating the own vehicle 60, another vehicle icon 74 indicating a preceding vehicle to be followed, and a specified value of the inter-vehicle time and the inter-vehicle distance as information related to the inter-vehicle time. The bar graph 76 can be displayed on the meter display 58 while the own vehicle 60 is running (see FIGS. 4 to 6). The bar graph 76 is an example of a "graphical image". As an example, the display control unit 70 uses the inter-vehicle distance and the relative speed between the own vehicle 60 and the preceding vehicle to be tracked detected by the radar device 22 to derive the inter-vehicle time between the own vehicle 60 and the preceding vehicle to be tracked.

FIG. 3 is a flowchart showing the flow of control processing in which the display control ECU 42 controls the display contents of the meter display 58. Control processing is performed by the CPU 44 reading out the display control program 54 from the storage unit 48, developing it in the memory 46, and executing it. As an example, the control process shown in FIG. 3 is periodically executed while the own vehicle 60 is running.

In S10 shown in FIG. 3, the CPU 44 causes the own vehicle icon 72 to be displayed at a predetermined position on the meter display 58. Then, the CPU 44 proceeds to S11.

In S11, the CPU 44 determines whether the inter-vehicle time control ACC is being executed. Here, when the CPU 44 determines that the inter-vehicle time control ACC is being executed (S11: YES), the process proceeds to S12. On the other hand, when the CPU 44 does not determine that the inter-vehicle time control ACC is being executed (S11: NO), the CPU 44 terminates the control process. In this embodiment, when the inter-vehicle time control ACC is turned on via the ACC switch 62, the CPU 44 determines that the inter-vehicle time control ACC is being executed.

In S12, the CPU 44 acquires, as detection information, specified values of the vehicle speed of the own vehicle 60, the inter-vehicle distance to the preceding vehicle to be followed, and the inter-vehicle time to the preceding vehicle to be followed. The CPU 44 acquires the vehicle speed of the own vehicle 60 from the vehicle speed sensor 30. The CPU 44 acquires from the radar device 22 the inter-vehicle distance to the preceding vehicle to be followed. The CPU 44 acquires from the ACC switch 62 the specified value of the inter-vehicle time to the preceding vehicle to be tracked. Then, the CPU 44 proceeds to S13.

At S13, the CPU 44 causes the other vehicle icon 74 and the bar graph 76 to be displayed at predetermined positions on the meter display 58. Specifically, the CPU 44 causes the other vehicle icon 74 to be displayed on the forward side of the own vehicle icon 72 in the traveling direction, at a position reflecting the inter-vehicle distance between the own vehicle 60 and the preceding vehicle to be followed. In addition, the CPU 44 displays a bar graph 76 in which one or more rectangular bars 78 (see FIGS. 4 to 6) are arranged along the traveling direction between the own vehicle icon 72 and the other vehicle icon 74. Then, the CPU 44 proceeds to S14.

In S14, the CPU 44 acquires, as detection information, specified values for the vehicle speed of the own vehicle 60, the inter-vehicle distance to the preceding vehicle to be followed, and the inter-vehicle time to the preceding vehicle to be followed. The CPU 44 acquires the vehicle speed of the own vehicle 60 from the vehicle speed sensor 30. The CPU 44 acquires from the radar device 22 the inter-vehicle distance to the preceding vehicle to be followed. The CPU 44 acquires from the ACC switch 62 the specified value of the inter-vehicle time to the preceding vehicle to be tracked. Then, the CPU 44 proceeds to S15.

In S15, the CPU 44 determines whether the magnitude of variation in the inter-vehicle distance between the own vehicle 60 and the preceding vehicle to be followed, which is included in the detection information acquired in S14, exceeds a predetermined threshold. Here, when the CPU 44 determines that the variation in the inter-vehicle distance exceeds the predetermined threshold value (S15: YES), the CPU 44 proceeds to S16. On the other hand, when the CPU 44 does not determine that the variation in the inter-vehicle distance exceeds the predetermined threshold value (S15: NO), the CPU 44 terminates the control process. In the present embodiment, a predetermined value is set as the threshold value, but the threshold value is not limited to this, and the threshold value may be manually set or changed by the operation of the passenger. Alternatively, the threshold may be automatically set or changed by the display control ECU 42 without the operation of the passenger.

At S16, the CPU 44 changes the display of the bar graph 76. A specific example of the content of the change will be described later. Then, the CPU 44 terminates the control process.

Next, a display example displayed on the meter display 58 as a result of the control processing shown in FIG. 3 being performed by the display control ECU 42 will be described.

Figure 4:
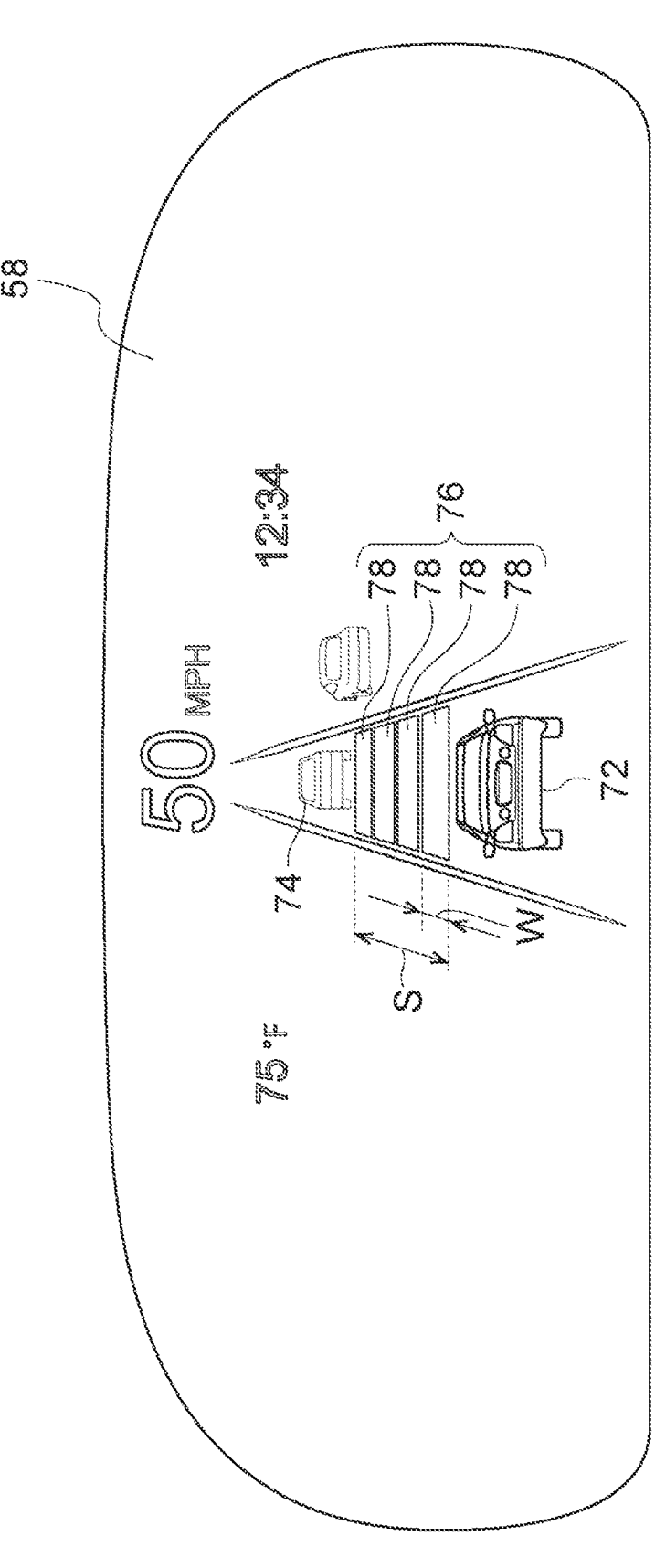
FIG. 4 is a first explanatory diagram showing a display example displayed on the meter display while the host vehicle is running.

FIG. 4 is a first explanatory diagram showing a display example displayed on the meter display 58 while the own vehicle 60 is running. As an example, FIG. 4 is a display example of the meter display 58 when the vehicle speed of the own vehicle 60 is "50 km/h".

The meter display 58 shown in FIG. 4 displays an own vehicle icon 72, another vehicle icon 74, and a bar graph 76 together with information such as vehicle speed and time.

On the meter display 58, the other vehicle icon 74 is displayed at a position reflecting the inter-vehicle distance between the own vehicle 60 and the preceding vehicle to be followed, and with a size corresponding to the inter-vehicle distance. For example, as the inter-vehicle distance increases, the other vehicle icon 74 is displayed in a smaller size and is displayed at a position spaced apart from the own vehicle icon 72.

Also, in the meter display 58, the bar graph 76 displays the number of bars 78 corresponding to the specified value of the inter-vehicle time between the own vehicle 60 and the preceding vehicle to be followed. In this embodiment, the number of displayed bars 78 is four when the specified value is "large", three when the specified value is "medium", two when the specified value is "small", and one when the specified value is "minimum". As an example, in FIG. 4 the specified value is "large", so the bar graph 76 displays four bars 78.

Here, in the display control ECU 42, the CPU 44 acquires detection information including the vehicle speed of the own vehicle 60 detected by the vehicle speed sensor 30 and the inter-vehicle distance between the own vehicle 60 and the preceding vehicle to be followed, which is detected by the radar device 22. Then, the CPU 44 causes the meter display 58 to display a bar graph 76 respectively indicating the specified value of the inter-vehicle time and the inter-vehicle distance derived using the acquired detection information. exceeds a predetermined threshold value, the display of the bar graph 76 is changed. With the above configuration, the display control ECU 42 changes the display of the bar graph 76 when the magnitude of the variation in the inter-vehicle distance exceeds a predetermined threshold, so that the occupant can grasp the change in the inter-vehicle distance by looking at the meter display 58.

Figure 5:
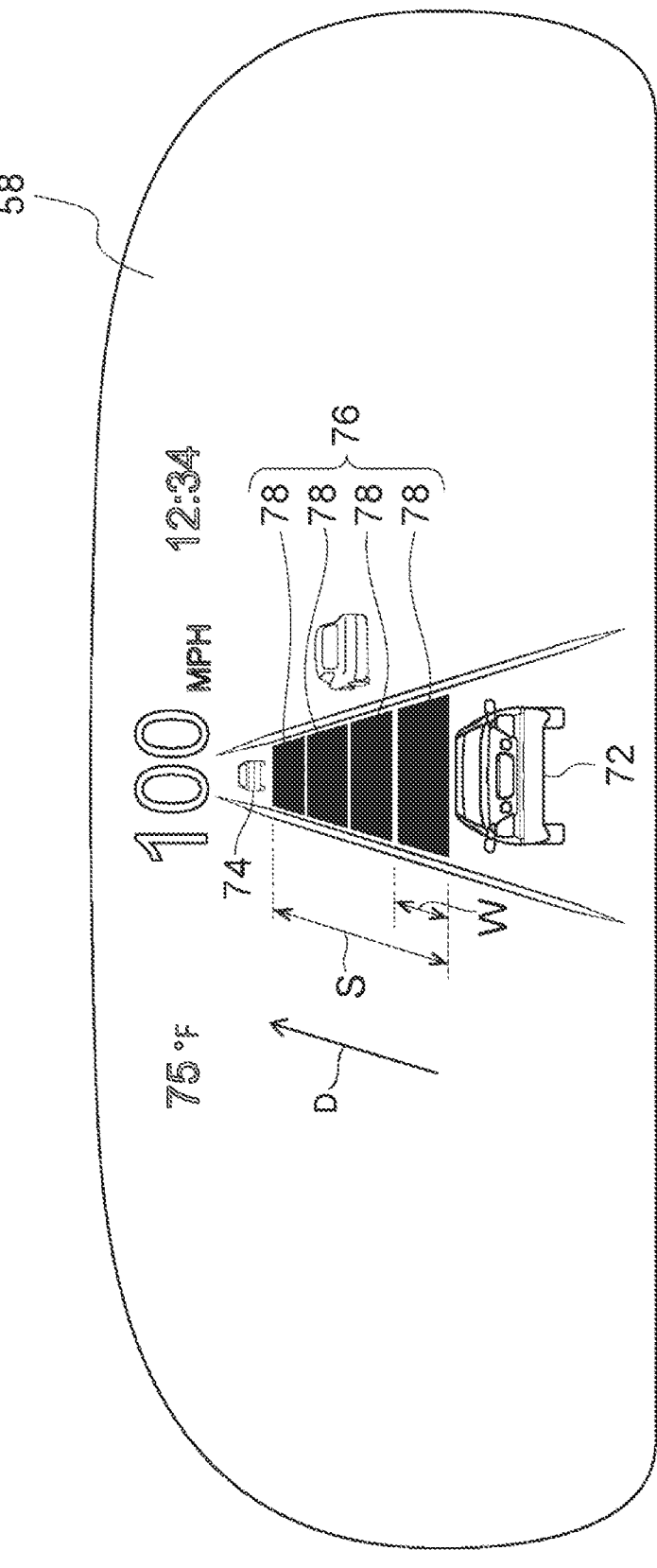
FIG. 5 is a second explanatory view showing a display example displayed on the meter display while the host vehicle is running.

FIG. 5 is a second explanatory diagram showing a display example displayed on the meter display 58 while the own vehicle 60 is running. Specifically, FIG. 5 shows a display example when the magnitude of the change in the inter-vehicle distance between the own vehicle 60 and the preceding vehicle to be followed exceeds a predetermined threshold after the display example shown in FIG. 4 is displayed. Moreover, FIG. 5 shows a case where the vehicle speed of the own vehicle 60 is "100 km/h".

Unlike the display example shown in FIG. 4, the meter display 58 shown in FIG. 5 shows the inner portions of individual bars 78 included in the bar graph 76 in black and the color of the bar graph 76 is changed before and after the magnitude of variation of the inter-vehicle distance between the own vehicle 60 and the preceding vehicle to be followed exceeds a predetermined threshold. It should be noted that the color of the bar graph 76 may return to white after a predetermined period of time has elapsed since the color was changed from white to black, or may remain black. As described above, in the display control ECU 42, the CPU 44, as a function of the display control unit 70, displays the bar before and after the variation in the inter-vehicle distance between the own vehicle 60 and the preceding vehicle to be followed exceeds a predetermined threshold value. The colors of the bar graph 76 are made different. As a result, the display control ECU 42 makes the color of the bar graph 76 different so that the occupant can grasp the change in the inter-vehicle distance through the color change.

FIG. 5 shows a display example of the meter display 58 when the inter-vehicle distance between the own vehicle 60 and the preceding vehicle to be followed is larger than in the case of FIG. 4. Therefore, the position of the other vehicle icon 74 is spaced apart from the own vehicle icon 72, and the size of the other vehicle icon 74 is smaller than in the case of FIG. 4. Further, in the display example of the meter display 58 shown in FIG. 5, the overall dimension of the bar graph 76 along the predetermined direction D corresponding to the traveling direction of the own vehicle 60 (hereinafter referred to as dimension S) is larger than in the case of FIG. 4. It's getting bigger. In this case, the display control ECU 42 increases the dimension S by increasing the dimension along the predetermined direction D (hereinafter referred to as dimension W) of each bar 78 included in the bar graph 76. As described above, in the display control ECU 42, the CPU 44, as a function of the display control unit 70, changes the dimensions of bar graph 76 along the predetermined direction D before and after the magnitude of variation of the inter-vehicle distance between the own vehicle 60 and the preceding vehicle to be followed exceeds the predetermined threshold. As a result, the display control ECU 42 varies the dimension of the bar graph 76 along the predetermined direction D, thereby allowing the occupant to grasp the variation in the inter-vehicle distance through the variation in the dimension.

Also, in the own vehicle 60 on which the in-vehicle system 10 is mounted, the autonomous driving ECU 34 receives a designated value of the inter-vehicle time as a function of the reception unit 64. Then, as a function of the travel control unit 66, the autonomous driving ECU 34 controls the traveling of the own vehicle 60 so that the detected value of the inter-vehicle time derived by the display control unit 70 of the display control ECU 42 corresponds to the received specified value of the inter-vehicle time. Here, in the inter-vehicle time control ACC, the inter-vehicle distance between the own vehicle 60 and the preceding vehicle to be followed varies according to the vehicle speed. The occupant may not be able to recognize the change in the inter-vehicle distance when the display of the bar graph 76 showing the inter-vehicle distance is not changed. However, since the own vehicle 60 is configured as described above, the vehicle 60 allow the occupant to grasp the change in the inter-vehicle distance by looking at the meter display 58 while controlling the running of the own vehicle 60 so that the inter-vehicle time becomes the specified value.

Second Embodiment

Next, a second embodiment of the in-vehicle system 10 according to the present embodiment will be described while omitting or simplifying portions that overlap with the above embodiment.

2nd Embodiment demonstrates the process in the in-vehicle system 10 when another vehicle has approached between the own vehicle 60 and the preceding vehicle to follow.

Figure 6:
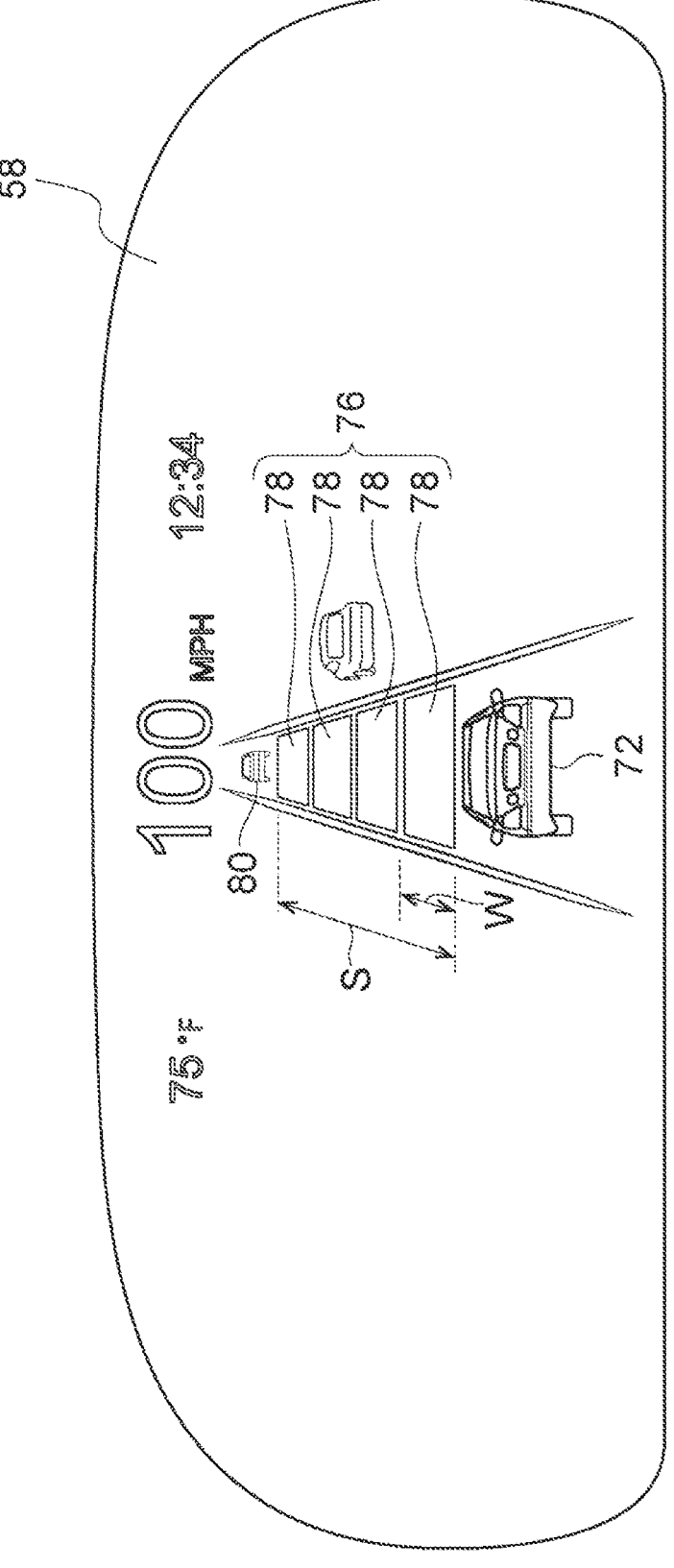
FIG. 6 is a third explanatory view showing a display example displayed on the meter display while the host vehicle is running.

FIG. 6 is a third explanatory view showing a display example displayed on the meter display 58 while the own vehicle 60 is running. As an example, FIG. 6 illustrates a display in a case where another vehicle enters between the own vehicle 60 and the preceding vehicle to be followed after the display example shown in FIG. 5 is displayed.

The meter display 58 shown in FIG. 6 displays an own vehicle icon 72 and a bar graph 76 together with information such as vehicle speed and time, as in the display example shown in FIG. 5. However, unlike the display example shown in FIG. 5, the meter display 58 shown in FIG. 6 displays, instead of the other vehicle icon 74, a different vehicle icon 80 at a position reflecting the inter-vehicle distance between the own vehicle 60 and the different vehicle on a forward side in the traveling direction in the bar graph 76. The different vehicle icon 80 is an example of the "different vehicle image".

As described above, in the display control ECU 42, the CPU 44, as a function of the display control unit 70, detects another vehicle that has entered between the own vehicle 60 and the preceding vehicle to be followed by the peripheral situation acquisition device group 14. In this case, instead of the other vehicle icon 74, the different vehicle icon 80 indicating the other vehicle is displayed on the meter display 58 at a position reflecting the inter-vehicle distance between the own vehicle 60 and the other vehicle on the front side of the bar graph 76 in the traveling direction. As a result, the display control ECU 42 allows the passenger to recognize the existence of another vehicle by looking at the meter display 58.

Others

In the above-described embodiment, the display control ECU 42 is used as an example of an information processing device. However, the display control ECU 42 is not limited to this, and an external device, such as a server, that is not installed in the own vehicle 60 may be an example of an information processing device. A combination of the ECU 42 and an external device may be an example of an information processing device. For example, when the combination of the display control ECU 42 and an external device is used as an example of an information processing device, the CPU of the external device may perform at least a part of each functional configuration of the CPU 44 of the display control ECU 42 shown in FIG. 2. In this case, the control processing shown in FIG. 3 is executed by one processor of the CPU 44 of the display control ECU 42 or the CPU of the external device, or by a combination of a plurality of processors of the CPU 44 of the display control ECU 42 and the CPU of the external device.

In the above-described embodiment, the meter display 58 is used as an example of the display unit, but the present disclosure is not limited to this, and displays other display devices mounted on the own vehicle 60 such as the HUD 56 or mobile terminals such as passenger smartphones installed in the vehicle. It is good also as an example of a part.

In the above embodiment, the display of the bar graph 76 is changed when the magnitude of the change in the inter-vehicle distance between the own vehicle 60 and the preceding vehicle to be followed, which is included in the detection information, exceeds a predetermined threshold. The timing of changing the display of bar graph 76 is not limited to this. For example, the CPU 44 of the display control ECU 42 functions as a function of the display control unit 70 when the magnitude of variation in the vehicle speed of the own vehicle 60 included in the detection information exceeds a predetermined threshold value, or when the vehicle speed and the inter-vehicle distance change. The display of the bar graph 76 may be changed when the magnitude of the fluctuation exceeds a predetermined threshold.

In the above-described embodiment, the control for changing the display of the bar graph 76 is not limited to being performed while the inter-vehicle time control ACC is being executed. For example, the CPU 44 of the display control ECU 42, as a function of the display control unit 70, detects the vehicle speed of the own vehicle 60 and the forward direction of the own vehicle 60 included in the detection information when the inter-vehicle time control ACC is not executed. The display of the bar graph 76 may be changed when the magnitude of variation in at least one of the inter-vehicle distances to another vehicle running in the area exceeds a predetermined threshold. In other words, the above control can be executed regardless of whether the vehicle 60 is traveling under the occupant's operation or autonomously traveling without the occupant's operation.

Note that the control processing executed by the CPU 44 by reading the software (program) in the above embodiment may be executed by various processors other than the CPU. The processor in this case is a programmable logic device (PLD) whose circuit configuration can be changed after manufacturing such as a field-programmable gate array (FPGA), and an application specific integrated circuit (ASIC) for executing specific processing. A dedicated electric circuit or the like, which is a processor having a specially designed circuit configuration, is exemplified. Also, the control processing may be executed by one of these various processors, or a combination of two or more processors of the same or different type (for example, a plurality of FPGAs, a combination of a CPU and an FPGA, etc.) can be run. More specifically, the hardware structure of these various processors is an electric circuit in which circuit elements such as semiconductor elements are combined.

Further, in the above-described embodiment, the display control program 54 is pre-stored (installed) in the storage unit 48, but the present disclosure is not limited to this. The display control program 54 may be provided in a form recorded in a recording medium such as a compact disk read only memory (CD-ROM), a digital versatile disk read only memory (DVD-ROM), and a universal serial bus (USB) memory. Also, the display control program 54 may be downloaded from an external device via a network.

What is claimed is:

1. An information processing device mounted on a first vehicle and comprising a processor configured to:
    acquire an inter-vehicle distance between the first vehicle and a second vehicle traveling in front of the first vehicle in a traveling direction of the first vehicle and a specified value of an inter-vehicle time that is required for the first vehicle to reach a position at which the second vehicle is located;
    cause a meter display in a vehicle cabin of the first vehicle to display a graphic image representing the specified value of the inter-vehicle time; and
    determine whether a magnitude of a change in the inter-vehicle distance exceeds a predetermined threshold, wherein the processor is configured to
    cause the meter display to display the graphic image in white in a case where the processor determines that the magnitude of the change is equal to or less than the predetermined threshold, and
    cause the meter display to display the graphic image in black in a case where the processor determines that the magnitude of the change exceeds the predetermined threshold.

2. The information processing device according to claim 1, wherein the processor is configured to change a dimension of the graphic image along a predetermined direction corresponding to the traveling direction in a case where the magnitude of the change exceeds the predetermined threshold.

3. The information processing device according to claim 1, wherein the graphic image is a quadrangle.

4. The information processing device according to claim 1, wherein the processor is further configured to:
    cause the meter display to display a first icon representing the first vehicle;
    cause the meter display to display a second icon representing the second vehicle at a position in front of the first icon; and
    cause the meter display to display the graphic image at a position between the first icon and the second icon.

5. The information processing device according to claim 1, wherein:
    the processor is further configured to
        determine which of a first stage, a second stage, a third stage, and a fourth stage the specified value of the inter-vehicle time is designated as,
        cause the meter display to display the graphic image in a case where the processor determines that the specified value of the inter-vehicle time is designated as the first stage,
        cause the meter display to display two of the graphic images in a case where the processor determines that the specified value of the inter-vehicle time is designated as the second stage,
        cause the meter display to display three of the graphic images in a case where the processor determines that the specified value of the inter-vehicle time is designated as the third stage, and
        cause the meter display to display four of the graphic images in a case where the processor determines that the specified value of the inter-vehicle time is designated as the fourth stage;
    the first stage, the second stage, the third stage, and the fourth stage are in a ascending order; and
    the fourth stage is the largest among the first stage, the second stage, the third stage, and the fourth stage.

6. The information processing device according to claim 1, wherein the processor is further configured to cause the meter display to display a third icon representing a third vehicle in a case where a sensor mounted on the first vehicle detects that the third vehicle has entered between the first vehicle and the second vehicle.

7. A vehicle comprising:
    the information processing device according to claim 1; and
    an electronic control unit configured to cause the first vehicle to travel based on the specified value of the inter-vehicle time.

* * * * *